April 18, 1939.  R. FIKE  2,154,836
VEHICLE WHEEL BRAKE
Filed June 21, 1938  2 Sheets-Sheet 1

Inventor
R. Fike
By Clarence A. O'Brien
and Hyman Berman
Attorneys

April 18, 1939.        R. FIKE        2,154,836
VEHICLE WHEEL BRAKE
Filed June 21, 1938        2 Sheets-Sheet 2
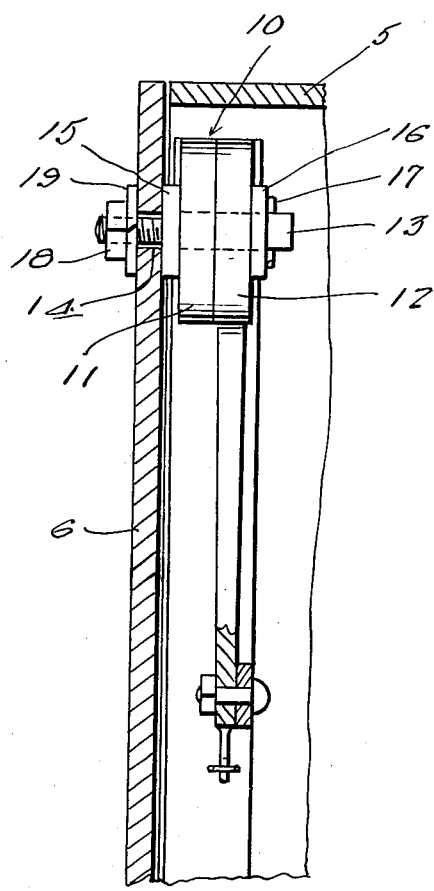
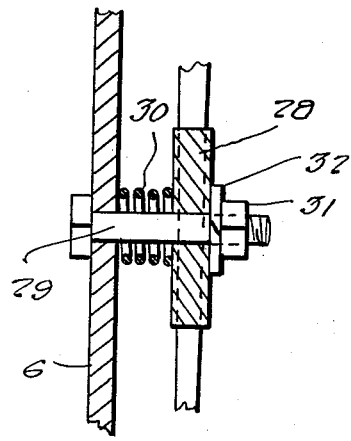
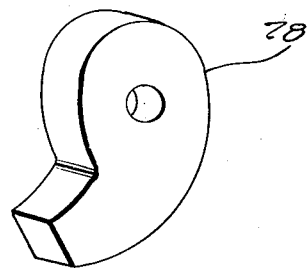
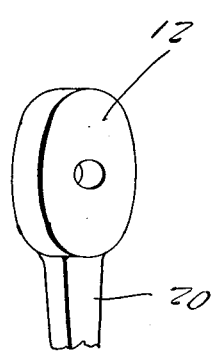
Inventor
R. Fike
By Clarence A. O'Brien
and Hyman Berman
Attorneys Patented Apr. 18, 1939

2,154,836

UNITED STATES PATENT OFFICE 2,154,836

VEHICLE WHEEL BRAKE

Roy Fike, Ravenna, Ky.

Application June 21, 1938, Serial No. 214,980

1 Claim. (Cl. 188—78)

This invention relates to vehicle wheel brakes and more particularly to brakes particularly designed for automobile wheels.

More particularly the invention has reference to improved means for adjusting the brake shoes.

Among the objects of the invention is the provision of means for adjusting a brake of the fluid power type; and the invention together with its objects and advantages will be best understood from a study of the following description taken in connection with the accompanying drawings wherein:—

Figure 1:
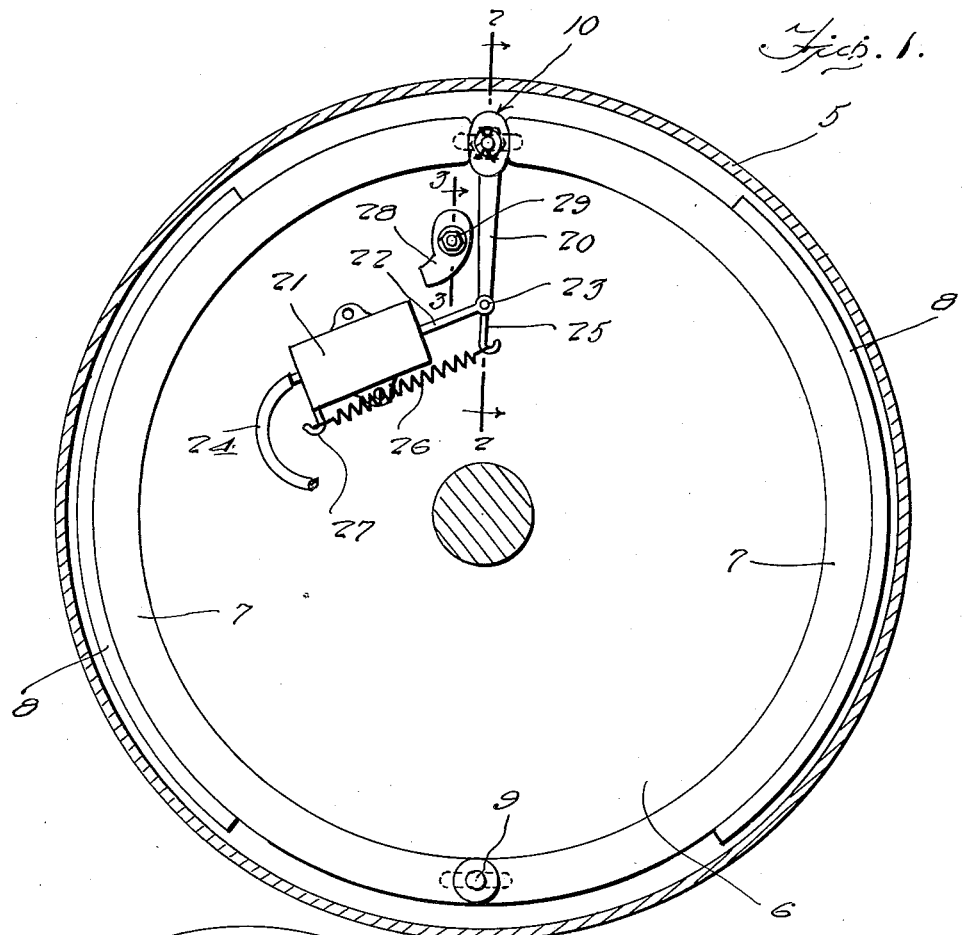
Figure 4:
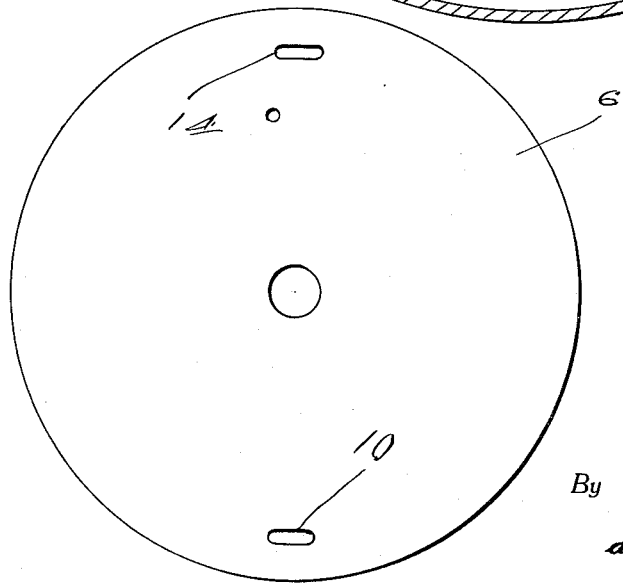

Figure 1 is a sectional view through a brake illustrating the application of the invention, Figures 2 and 3 are sectional views taken substantially on the lines 2—2 and 3—3 respectively of Figure 1, Figure 4 is an elevational view of the backing plate, Figure 5 is a perspective view of an adjusting cam, and Figure 6 is a perspective view of a spreader cam.

Referring to the drawings by reference numerals it will be seen that 5 indicates generally a rotatable drum forming part of the wheel brake and 6 indicates the fixed backing plate that, as is well-known, is arranged at the open side of the drum. The brake shoes are indicated by the reference numerals 7 and are provided with the usual linings 8.

In accordance with the present invention the shoes 7—7 at one end are pivoted to each other and to the backing plate 6 through the medium of a pivot bolt 9 that is accommodated within a slot 10 provided therefor in the lower portion of the backing plate 6.

Arranged between the confronting or adjacent free ends of the shoes 7 is a spreader cam 10. In the present instance the spreader cam 10 comprises two sections 11, 12 placed in facial contact and welded or otherwise secured together whereby to provide a cam of a thickness corresponding substantially to the thickness of the shoes 7 as will be clear from a study of Figure 2.

The cam 10 pivots on a bolt 13 that extends into the drum 5 through a slot 14 provided therefor in the backing plate 6.

The cam 10 is retained on the pivot bolt 13 between washers 15 and 16, washer 16 being disposed between one side of the cam and a cotter pin or other retaining element 17 provided on the inner end of the bolt 13; while washer 15 is interposed between the opposite side of the cam 10 and the backing plate 6. On the outer end thereof the bolt 13 is provided with a nut 18 and a locking washer 19 through the medium of which the bolt 13 is secured at the desired position of adjustment within the aforementioned slot 14.

The part or section 12 of cam 10 is provided with an integral lever 20 as shown.

Also, suitably mounted on the backing plate 6 within the confines of the drum 5 is a hydraulic cylinder 21. Cylinder 21, as is conventional, has working therein a piston the rod of which is indicated by the reference numeral 22 and is pivoted at its outer end as at 23 to the lever 20. Cylinder 21 at one end thereof is connected through the medium of a conduit 24 and in a conventional manner with the usual master cylinder of the hydraulic brake system.

Also, and as shown, lever 20 at the free end thereof is provided with a hook 25 with which is engaged one end of a spring 26, the opposite end of the spring being engaged with a suitable hook 27 mounted on the cylinder 21. Obviously, spring 26 acts to yieldably return the piston within the cylinder 21 to its normal position, or the position occupied when the brake is released.

In connection with the above it will be understood that the brake shoes 7 will be provided with the usual return springs acting to normally retain the shoes out of engagement with the flange of the brake drum.

Also, in accordance with the present invention there is provided an adjusting cam 28. Cam 28 pivots on a bolt 29 that extends inwardly of the brake drum 5 through an opening in the backing plate 6. The cam 28 is retained on the pivot bolt 29 at the desired position of adjustment through the medium of a coil spring 30 interposed between the backing plate 6 and one side of the cam 28 and a nut 31 threaded on the inner end of the bolt at the opposite side of the cam. Interposed between the nut 31 and the cam 28 is a lock washer 32 for the nut 31.

When it is desired to equalize the shoes the cam 28 is adjusted to a point where it will engage the member 20 and cause the cam 10 to expand the shoes to a point where the shoes will lightly engage the drum. Then the nuts of bolts 9 and 13 are loosened to permit said bolts to slide in the slots 10 and 14 of the backing plate 6, which they will do if the shoes are not equalized and then the nuts are tightened to hold said bolts 9 and 13 in adjusted position. Then the cam 28 is moved back to inoperative position and out of the way of the lever 20 which, of course, will free the shoes from the drum. Thus the cam 28 facilitates the proper adjustment of the two shoes to equalize the pressure of the shoes on the drum when the brakes are applied.

It is thought that a clear understanding of the construction, operation, utility and advantages of a hydraulic vehicle wheel brake embodying the features of the present invention will be had without a more detailed description.

Having thus described the invention what is claimed as new is:—

A brake of the class described comprising a backing plate having a pair of slots therein, a pair of shoes, a bolt passing through one slot and pivotally connecting one end of the shoes together, a cam located between the other ends of the shoes, a bolt passing through the cam into the other slot, a lever connected with the cam, actuating means connected with the lever for causing the cam to expand the shoes and a second cam rotatably supported by the backing plate and adapted to be adjusted against the lever to lightly apply the shoes, after which the bolts are loosened to permit the bolts to adjust themselves in the slots to equalize the pressure of the shoes on the brake drum, after which the bolts are tightened and the second cam moved out of engagement with the lever.

ROY FIKE.